(12) United States Patent
Mase

(10) Patent No.: US 12,181,070 B2
(45) Date of Patent: Dec. 31, 2024

(54) VALVE DEVICE AND SYSTEM IN WHICH THE VALVE DEVICE IS MOUNTED

(71) Applicant: AISAN KOGYO KABUSHIKI KAISHA, Obu (JP)

(72) Inventor: Makoto Mase, Handa (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 338 days.

(21) Appl. No.: 17/824,659

(22) Filed: May 25, 2022

(65) Prior Publication Data

US 2022/0299131 A1  Sep. 22, 2022

Related U.S. Application Data

(62) Division of application No. 17/084,921, filed on Oct. 30, 2020, now Pat. No. 11,448,339.

(30) Foreign Application Priority Data

Nov. 12, 2019  (JP) ................ 2019-204893

(51) Int. Cl.
*F16K 37/00* (2006.01)
*F16K 31/04* (2006.01)

(52) U.S. Cl.
CPC ........ *F16K 37/0041* (2013.01); *F16K 31/046* (2013.01)

(58) Field of Classification Search
CPC ................ F16K 31/046; F16K 37/0041
See application file for complete search history.

(56) References Cited

U.S. PATENT DOCUMENTS

| 4,631,478 A | 12/1986 | Knetsch et al. |
| 5,429,090 A * | 7/1995 | Kotchi ............ F02D 9/02 123/399 |

(Continued)

FOREIGN PATENT DOCUMENTS

| JP | S58-210515 A | 12/1983 |
| JP | H8-101006 A | 4/1996 |

(Continued)

OTHER PUBLICATIONS

Japanese Office Action (JP OA) for JP Pat. App. No. 2019-204893 mailed Dec. 6, 2022 (6 pages total—English translation and Japanese OA).

*Primary Examiner* — Eric Keasel
(74) *Attorney, Agent, or Firm* — Shumaker, Loop & Kendrick, LLP

(57) ABSTRACT

A valve device that includes a valve body; a valve shaft configured to rotate the valve body; a coil spring being electrically conductive and configured to be twisted with rotation of the valve body and the valve shaft; a first conductive member being electrically conductive and facing an inner circumferential surface or an outer circumferential surface of the coil spring in a radial direction of the coil spring; and a first detector configured to detect at least one of a rotation angle of the valve body or a rotation angle of the valve shaft based on an electrostatic capacitance between the coil spring and the first conductive member, the electrostatic capacitance changing according to a state of the coil spring that changes with the rotation of the valve body and the valve shaft.

2 Claims, 6 Drawing Sheets

(56) References Cited

U.S. PATENT DOCUMENTS

| | | | |
|---|---|---|---|
| 5,609,183 A * | 3/1997 | Parker | F16K 37/0041 |
| | | | 137/554 |
| 5,681,990 A | 10/1997 | Hampo et al. | |
| 6,492,911 B1 | 12/2002 | Netzer | |
| 6,788,220 B2 | 9/2004 | Netzer | |
| 7,126,495 B2 | 10/2006 | Netzer | |
| 7,302,931 B2 * | 12/2007 | Saito | F02D 9/107 |
| | | | 123/399 |
| 7,367,132 B2 | 5/2008 | Mitsuhashi | |
| 8,375,921 B2 * | 2/2013 | Uchiyama | G01D 5/04 |
| | | | 123/399 |
| 2012/0304964 A1 * | 12/2012 | Nemoto | G01D 5/2225 |
| | | | 324/207.13 |
| 2021/0140562 A1 | 5/2021 | Mase | |

FOREIGN PATENT DOCUMENTS

| | | |
|---|---|---|
| JP | H11-051607 A | 2/1999 |
| JP | 2002-542476 A | 12/2002 |
| JP | 3412276 B2 | 6/2003 |
| JP | 2003-185406 A | 7/2003 |
| JP | 2004-212061 A | 7/2004 |
| JP | 2005-233853 A | 9/2005 |
| JP | 2006-266903 A | 10/2006 |
| JP | 2012-202975 A | 10/2012 |
| JP | 2019-078296 A | 5/2019 |
| JP | 2019-124527 A | 7/2019 |

* cited by examiner

VALVE DEVICE AND SYSTEM IN WHICH THE VALVE DEVICE IS MOUNTED

TECHNICAL FIELD

The present disclosure relates to a valve device and a system in which the valve device is mounted.

BACKGROUND

Japanese Patent Application Publication No. 2019-124527 describes a throttle valve. The throttle valve of Japanese Patent Application Publication No. 2019-124527 includes a rotary body and a coil spring (return spring) configured to be twisted with rotation of the rotary body. Japanese Patent Application Publication No. 2019-124527 further describes a rotation angle detector. The rotation angle detector described in Japanese Patent Application Publication No. 2019-124527 includes a rotary body, a rotor disposed coaxially with the rotary body, a rotary conductive member disposed coaxially with the rotor at one end of the rotor, a fixed conductive member disposed to face the rotary conductive member, and an electronic circuit configured to detect a rotation position of the rotary body based on a change in an inductance between the rotary conductive member and the fixed conductive member according to a position of the rotary conductive member in its rotation direction.

SUMMARY

In the technique of Japanese Patent Application Publication No. 2019-124527, the rotary conductive member and the fixed conductive member need to be disposed to detect the rotation position of the rotary body, which may cause the rotation angle detector to become oversized and complicated. In view of this, the disclosure herein provides art that enables a valve device to determine a rotation angle while preventing the valve device from becoming oversized and complicated.

A valve device disclosed herein may comprise: a valve body; a valve shaft configured to rotate the valve body; a coil spring being electrically conductive and configured to be twisted with rotation of the valve body and the valve shaft; a first conductive member being electrically conductive and facing an inner circumferential surface or an outer circumferential surface of the coil spring in a radial direction of the coil spring; and a first detector configured to detect at least one of a rotation angle of the valve body or a rotation angle of the valve shaft based on an electrostatic capacitance between the coil spring and the first conductive member, the electrostatic capacitance changing according to a state of the coil spring that changes with the rotation of the valve body and the valve shaft.

This configuration enables detection of at least one of the rotation angle of the valve body or the rotation angle of the valve shaft by using a change in the electrostatic capacitance between the coil spring and the first conductive member in response to rotation of the valve body and the valve shaft. In realizing the configuration for determining the rotation angle in the valve device, the above configuration enables detection of the rotation angle by using the coil spring that is twisted with the rotation of the valve body and the valve shaft without any additional configurations such as a rotary conductive member and a fixed conductive member as in the conventional technique. This can prevent the valve device from becoming oversized and complicated.

The first conductive member may define a circumferential wall extending in an axial direction of the valve shaft. The circumferential wall may face the coil spring over a whole area from one end to another end of the coil spring in an axial direction of the coil spring.

In this configuration, the coil spring and the first conductive member face each other over a large area. Due to this, the electrostatic capacitance between the coil spring and the first conductive member greatly changes when the valve body and the valve shaft rotate. This can ensure that an output value required for determining at least one of the rotation angle of the valve body or the rotation angle of the valve shaft is outputted.

The present disclosure discloses a system in which the above valve device may be mounted. The system may comprise two power sources. The valve device may further comprise a motor configured to be operated by direct current and rotate the valve shaft. One of the two power sources may be configured to apply a voltage to the motor and another of the two power sources may be configured to apply a voltage to at least one of the coil spring or the first conductive member to generate a potential difference between the coil spring and the first conductive member.

This configuration can provide increased accuracy for the detection of the rotation angle.

Another valve device disclosed herein may comprise: a valve body; a valve shaft configured to rotate the valve body; a coil spring being electrically conductive and configured to be twisted with rotation of the valve body and the valve shaft; and a second detector configured to detect at least one of a rotation angle of the valve body or a rotation angle of the valve shaft based on an inductance of the coil spring, the inductance changing according to a state of the coil spring that changes with the rotation of the valve body and the valve shaft.

This configuration enables detection of at least one of the rotation angle of the valve body or the rotation angle of the valve shaft by using a change in the inductance of the coil spring in response to rotation of the valve body and the valve shaft. In realizing the configuration for determining the rotation angle in the valve device, the above configuration enables detection of the rotation angle by using the coil spring that is twisted with the rotation of the valve body and the valve shaft without any additional configurations such as the rotary conductive member and the fixed conductive member as in the conventional technique. This can prevent the valve device from becoming oversized and complicated.

The valve device may further comprise at least one second conductive member being electrically conductive and arranged on at least one of: an inner side relative to an inner circumferential surface of the coil spring or an outer side relative to an outer circumferential surface of the coil spring in a radial direction of the coil spring.

In this configuration, the at least one second conductive member functions as a core of the coil spring, which can ensure that the output value for determining at least one of the rotation angle of the valve body or the rotation angle of the valve shaft is outputted.

The at least one second conductive member may define a circumferential wall extending in an axial direction of the valve shaft. The circumferential wall may face the coil spring over a whole area from one end to another end of the coil spring in an axial direction of the coil spring.

In this configuration, the coil spring and the at least one second conductive member face each other over a large area. Due to this, the electrostatic capacitance between the coil spring and the at least one second conductive member greatly changes when the valve body and the valve shaft rotate. This can ensure that the output value for determining at least one of the rotation angle of the valve body or the rotation angle of the valve shaft is outputted.

The present disclosure discloses a system in which the other valve device may be mounted. The system may comprise two power sources. The valve device may further comprise a motor configured to be operated by direct current and to rotate the valve shaft. One of the two power sources may be configured to apply a voltage to the motor and another of the two power sources may be configured to apply a voltage to at least one of the coil spring or the at least one second conductive member to generate a potential difference between the coil spring and the at least one second conductive member.

This configuration can provide increased accuracy for the detection of the rotation angle.

DETAILED DESCRIPTION

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved valve devices, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 1:
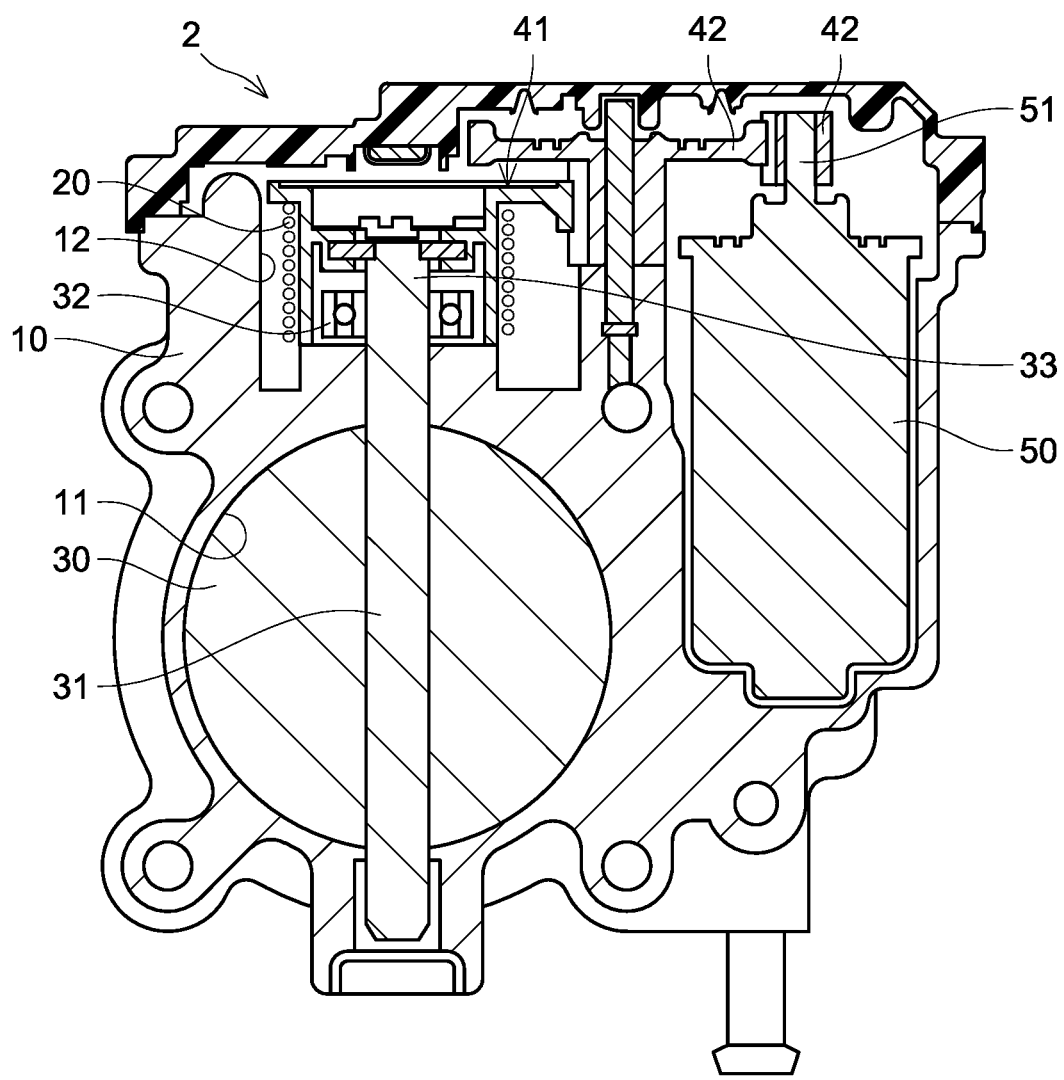
FIG. 1 is a cross-sectional view of a valve device of a first embodiment.

A valve device 2 of a first embodiment will be described. As shown in FIG. 1, the valve device 2 includes a casing 10, a valve body 30, and a motor 50. The valve device 2 shown in FIG. 1 is, for example, mounted on an automobile with an engine. The valve device 2 is, for example, disposed on an intake passage through which air to be suctioned into the engine of the automobile flows. The valve device 2 is used to control a flow rate of the air flowing through the intake passage. The valve device 2 may be called a throttle valve.

The casing 10 of the valve device 2 includes a housing unit 12 and a passage unit 11. The housing unit 12 houses a first gear 41, a plurality of second gears 42, the motor 50, and a coil spring 20 to be described later. The passage unit 11 of the casing 10 constitutes a part of the intake passage through which the air to be suctioned into the engine of the automobile flows. The passage unit 11 has a substantially cylindrical shape. The air flows along an axial direction of the cylindrical passage unit 11 (direction perpendicular to a sheet surface of FIG. 1). The valve body 30 is disposed inside the passage unit 11.

The valve body 30 has a substantially disk shape. The valve body 30 is fixed to a valve shaft 31. The valve shaft 31 extends in a radial direction of the passage unit 11 (direction orthogonal to the axial direction of the passage unit 11). The valve shaft 31 is supported rotatably by a bearing 32 fixed to the casing 10. The valve body 30 rotates with rotation of the valve shaft 31. The valve body 30 changes a cross-sectional area inside the passage unit 11 (passage area of the intake passage) by rotating inside the passage unit 11. The change in the passage area of the intake passage changes the flow rate of the air flowing through the intake passage. For example, when the valve body 30 rotates forward, the passage area increases and the air flow rate increases. Further, when the valve body 30 rotates in reverse, the passage area decreases and the air flow rate decreases. The air flow rate changes based on a rotation angle of the valve body 30.

The first gear 41 is fixed to an end 33 of the valve shaft 31. The first gear 41 is mechanically connected to a rotary shaft 51 of the motor 50 via the plurality of second gears 42. When the rotary shaft 51 of the motor 50 rotates, the second gears 42 and the first gear 41 rotate. When the first gear 41 rotates, the valve shaft 31 and the valve body 30 rotate. The motor 50 is configured to be operated by direct current and rotate the valve shaft 31.

Figure 2:
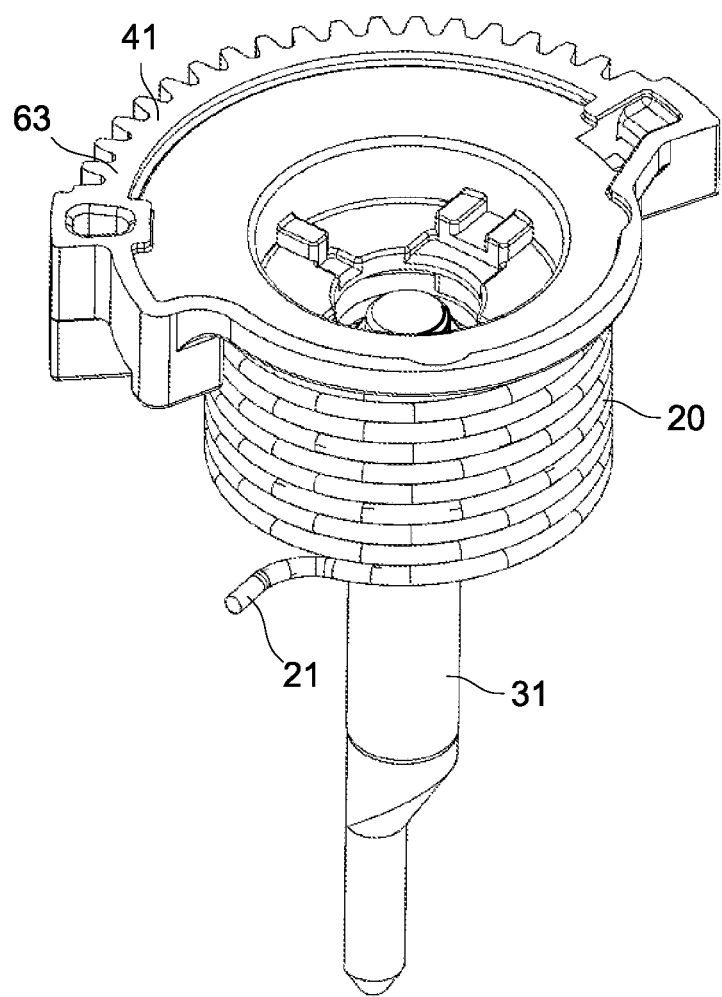
FIG. 2 is a perspective view of a part of the valve device of the first embodiment.
Figure 3:
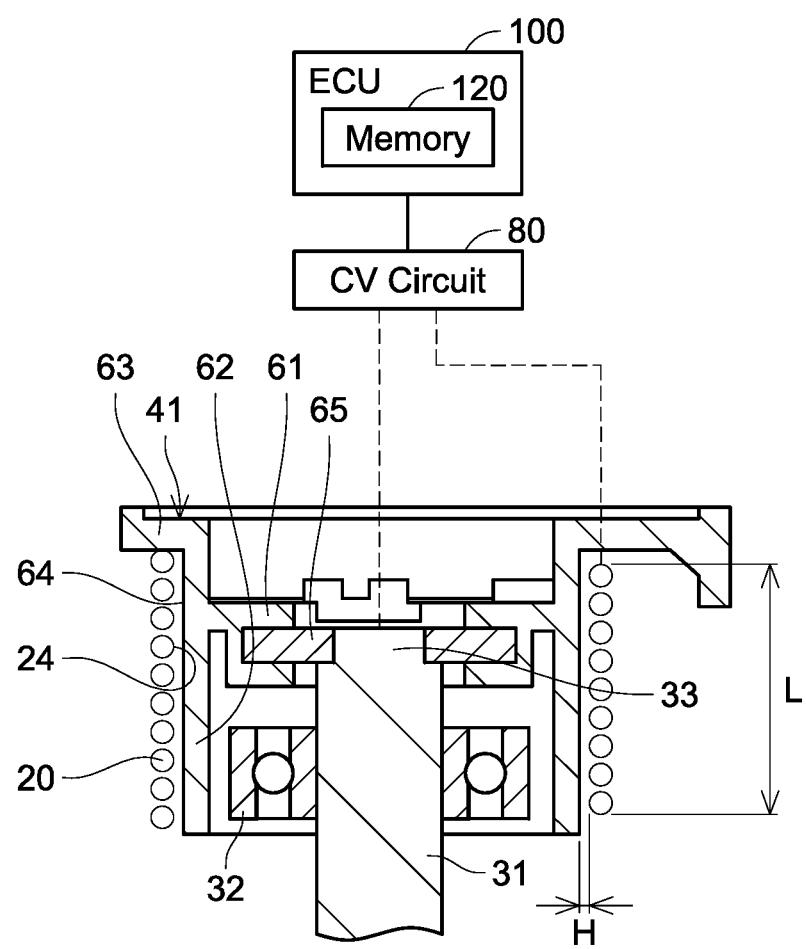
FIG. 3 is a cross-sectional view of a part of the valve device of the first embodiment.

As shown in FIGS. 2 and 3, the first gear 41 includes a shaft portion 61, an inner guide 62 (example of a first conductive member), and a gear 63. The first gear 41 is constituted of a conductor such as metal or conductive resin. The conductor is electrically conductive. The shaft portion 61 is fixed to the valve shaft 31 via a fastener 65. The inner guide 62 is fixed to the shaft portion 61. The gear 63 is fixed to the inner guide 62. The gear 63 of the first gear 41 is connected to the rotary shaft 51 of the motor 50 via the plurality of second gears 42 (see FIG. 1).

The inner guide 62 of the first gear 41 is disposed around the valve shaft 31. The inner guide 62 has a substantially cylindrical shape. The inner guide 62 surrounds the valve shaft 31. The inner guide 62 is disposed coaxially with the valve shaft 31. The inner guide 62 extends in an axial direction of the valve shaft 31. A portion of the inner guide 62 facing the coil spring 20 is constituted as a conductive member. The coil spring 20 is disposed around the inner guide 62. The inner guide 62 faces an inner circumferential surface 24 of the coil spring 20 over an area from one end to the other end of the coil spring 20 in an axial direction of the coil spring 20. The inner guide 62 faces the inner circumferential surface 24 of the coil spring 20 over a whole area of the coil spring 20 in the axial direction. In other words, the inner guide 62 defines a circumferential wall extending in the axial direction of the valve shaft 31. The circumferential wall (inner guide 62) is disposed to face the coil spring 20 over the whole area of the coil spring 20 from its one end to the other end in the axial direction.

The coil spring 20 is wound around the inner guide 62. The coil spring 20 surrounds the valve shaft 31 and the inner guide 62. The coil spring 20 is disposed coaxially with the valve shaft 31 and the inner guide 62. The coil spring 20 is constituted of a conductor such as metal or conductive resin. The conductor is electrically conductive. The coil spring 20 is configured of a wound conductor wire. The inner circumferential surface 24 of the coil spring 20 faces an outer circumferential surface 64 of the inner guide 62 in a radial direction of the coil spring 20. The inner circumferential surface 24 of the coil spring 20 is at a position separated from the outer circumferential surface 64 of the inner guide 62. A clearance is defined between the inner circumferential surface 24 of the coil spring 20 and the outer circumferential surface 64 of the inner guide 62. The coil spring 20 being the conductive member and the inner guide 62 being the conductive member constitute a capacitor by facing each other.

Figure 4:
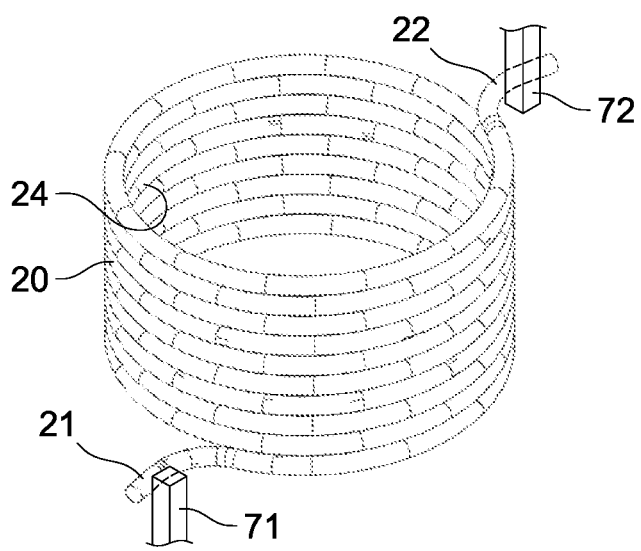
FIG. 4 is a perspective view of a coil spring of the first embodiment.

As shown in FIG. 4, the coil spring 20 includes a fixed abutment portion 21 and a rotary abutment portion 22. The fixed abutment portion 21 is disposed at one end of the coil spring 20 and the rotary abutment portion 22 is disposed at the other end thereof. The fixed abutment portion 21 abuts a first abutment portion 71. The first abutment portion 71 is disposed on an inner surface of the casing 10 housing the coil spring 20 (not shown). Forward rotation of the coil spring 20 (for example, counter-clockwise rotation) is restricted by the fixed abutment portion 21 coming into abutment with the first abutment portion 71.

The rotary abutment portion 22 at the other end of the coil spring 20 abuts a second abutment portion 72. The second abutment portion 72 is disposed on an outer surface of the first gear 41 housed in the casing 10 (not shown). Reverse rotation of the coil spring 20 (for example, clockwise rotation) is restricted by the rotary abutment portion 22 coming into abutment with the second abutment portion 72. When the first gear 41 rotates forward, the rotary abutment portion 22 comes into abutment with the second abutment portion 72.

When the first gear 41 rotates, the coil spring 20 is thereby twisted. When the first gear 41 rotates forward, the coil spring 20 is twisted in a forward rotation direction (for example, counter-clockwise). When the first gear 41 rotates in reverse, this twist in the coil spring 20 is released. When the coil spring 20 is twisted, a diameter of the coil spring 20 decreases. When the diameter of the coil spring 20 decreases, a distance H between the inner circumferential surface 24 of the coil spring 20 and the outer circumferential surface 64 of the inner guide 62 becomes shorter (see FIG. 3). Further, when the coil spring 20 is twisted, a length L of the coil spring 20 in the axial direction becomes longer. When the length L of the coil spring 20 in the axial direction becomes longer, the area over which the inner circumferential surface 24 of the coil spring 20 faces the outer circumferential surface 64 of the inner guide 62 becomes larger.

As shown in FIG. 3, the valve device 2 includes a CV circuit 80 and an engine control unit (ECU) 100.

The CV circuit 80 is connected to the coil spring 20 and the inner guide 62 of the first gear 41. The CV circuit 80 is a circuit configured to output a voltage value depending on an electrostatic capacitance of a capacitor to which the CV circuit 80 is connected. The electrostatic capacitance of a capacitor is generally proportional to an area over which a pair of conductive members faces each other, and is inversely proportional to a distance between this pair of conductive members. The coil spring 20 and the inner guide 62 of the valve device 2 constitute a capacitor. The CV circuit 80 outputs a voltage value depending on the electrostatic capacitance between the coil spring 20 and the inner guide 62 (that is, the electrostatic capacitance of the capacitor). Since the CV circuit 80 is incorporated in a known CV converter, a detailed description thereof will be omitted.

Figure 5:
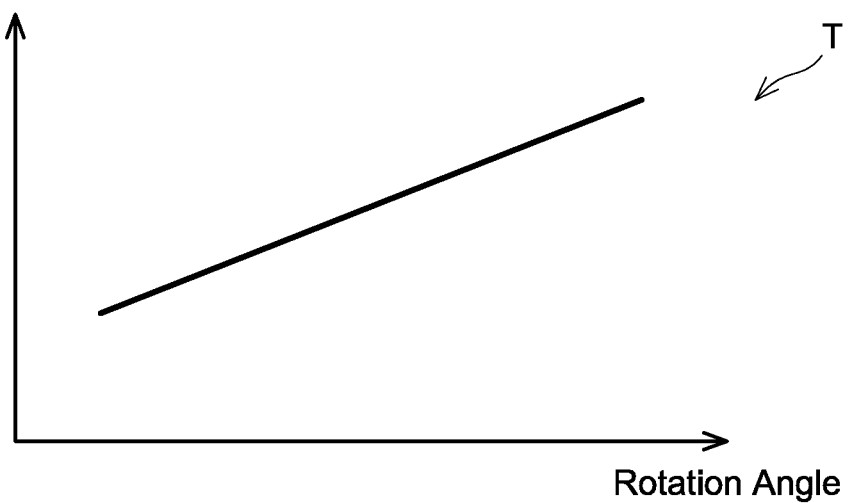
FIG. 5 is a diagram showing a graph T of the first embodiment.

The ECU 100 is configured to execute processes and control related to the valve device 2. The ECU 100 includes a memory 120. The ECU 100 is configured to determine the rotation angle of the first gear 41, the valve shaft 31, and the valve body 30 based on the voltage value outputted from the CV circuit 80. As shown in FIG. 5, the ECU 100 stores, in advance in the memory 120, a graph T indicating a relationship between the voltage value and the rotation angle of the first gear 41, the valve shaft 31, and the valve body 30. The ECU 100 uses the graph T stored in the memory 120 to determine the rotation angle of the first gear 41, the valve shaft 31, and the valve body 30 based on the voltage value outputted from the CV circuit 80. The graph T is obtained in advance by experiments and/or analyses. For example, the graph T is created in advance by determining a relationship between the rotation angle exhibited when the first gear 41, the valve shaft 31, and the valve body 30 rotate and the voltage value outputted from the CV circuit 80 in response to the rotation thereof by experiments. The graph T created as such is stored in the memory 120.

Next, an operation of the valve device 2 will be described. In the valve device 2 as above, the first gear 41, the valve shaft 31, and the valve body 30 rotate (forward or in reverse) when the rotary shaft 51 of the motor 50 rotates (forward or in reverse).

When the first gear 41, the valve shaft 31, and the valve body 30 rotate forward, the coil spring 20 is thereby twisted circumferentially in the forward rotation direction. When the coil spring 20 is twisted in the forward rotation direction, the diameter of the coil spring 20 decreases. That is, the inner circumferential surface 24 of the coil spring 20 approaches the outer circumferential surface 64 of the inner guide 62, by which the distance H between the coil spring 20 and the inner guide 62 becomes shorter. As a result, the electrostatic capacitance between the coil spring 20 and the inner guide 62 becomes larger. Further, when the coil spring 20 is twisted in the forward rotation direction, the length L of the coil spring 20 in the axial direction becomes longer. That is, the area over which the inner circumferential surface 24 of the coil spring 20 faces the outer circumferential surface 64 of the inner guide 62 increases. As a result, the electrostatic capacitance between the coil spring 20 and the inner guide 62 becomes larger. The larger the rotation angle of the first gear 41, the valve shaft 31, and the valve body 30 is, the larger the electrostatic capacitance between the coil spring 20 and the inner guide 62 becomes.

When the first gear 41, the valve shaft 31, and the valve body 30 rotate in reverse, the twist of the coil spring 20 is released. When the twist of the coil spring 20 is released, the diameter of the coil spring 20 becomes larger. That is, the inner circumferential surface 24 of the coil spring 20 moves away from the outer circumferential surface 64 of the inner guide 62, by which the distance H between the coil spring 20 and the inner guide 62 becomes longer. As a result, the electrostatic capacitance between the coil spring 20 and the inner guide 62 becomes smaller. Further, when the twist of the coil spring 20 is released, the length L of the coil spring 20 in the axial direction becomes shorter. That is, the area over which the inner circumferential surface 24 of the coil spring 20 faces the outer circumferential surface 64 of the inner guide 62 decreases. As a result, the electrostatic capacitance between the coil spring 20 and the inner guide 62 becomes smaller.

The ECU 100 determines the rotation angle of the valve body 30 and the valve shaft 31 based on the electrostatic capacitance that changes between the coil spring 20 and the inner guide 62 in response to the rotation of the valve body 30 and the valve shaft 31. More specifically, the CV circuit 80 connected to the coil spring 20 and the inner guide 62 outputs a voltage value depending on the electrostatic capacitance between the coil spring 20 and the inner guide 62 when the coil spring 20 is not twisted or the electrostatic capacitance therebetween when the coil spring 20 is twisted. Then, based on the voltage value outputted from the CV circuit 80, the ECU 100 determines the rotation angle of the first gear 41, the valve shaft 31, and the valve body 30. The ECU 100 determines the rotation angle of the first gear 41, the valve shaft 31, and the valve body 30 according to the graph T (see FIG. 5) stored in the memory 120. Due to this, the ECU 100 corresponds to a first detector.

(Effects)

The valve device 2 of the first embodiment has been described above. As it is apparent from the above disclosure, the valve device 2 includes the coil spring 20 configured to be twisted with the rotation of the first gear 41, the valve shaft 31, and the valve body 30, and the inner guide 62 being the conductive member that faces the inner circumferential surface 24 of the coil spring 20 in the radial direction of the coil spring 20. Further, the valve device 2 includes the ECU 100 configured to determine the rotation angle of the first gear 41, the valve shaft 31, and the valve body 30 based on the voltage value depending on the electrostatic capacitance between the coil spring 20 and the inner guide 62 exhibited when the coil spring 20 is twisted with the rotation of the first gear 41, the valve shaft 31, and the valve body 30.

This configuration enables the determination of the rotation angle of the first gear 41, the valve shaft 31, and the valve body 30 by using the existing configuration. That is, the configuration can provide the function of detecting the rotation angle to the valve device 2 while preventing the valve device 2 from becoming oversized and complicated.

In the above valve device 2, the inner guide 62 is disposed to face the coil spring 20 over the whole area from the one end to the other end of the coil spring 20 in the axial direction of the coil spring 20. In this configuration, the area over which the coil spring 20 faces the inner guide 62 is large. As such, the electrostatic capacitance between the coil spring 20 and the inner guide 62 greatly changes upon when the coil spring 20 is twisted, by which accuracy for determining the rotation angle can be increased.

One embodiment has been described above, however, specific aspects are not limited to the above embodiment. In the description below, the same reference signs will be given to configurations identical to those in the foregoing disclosure, and description thereof will be omitted.

Second Embodiment

Figure 6:
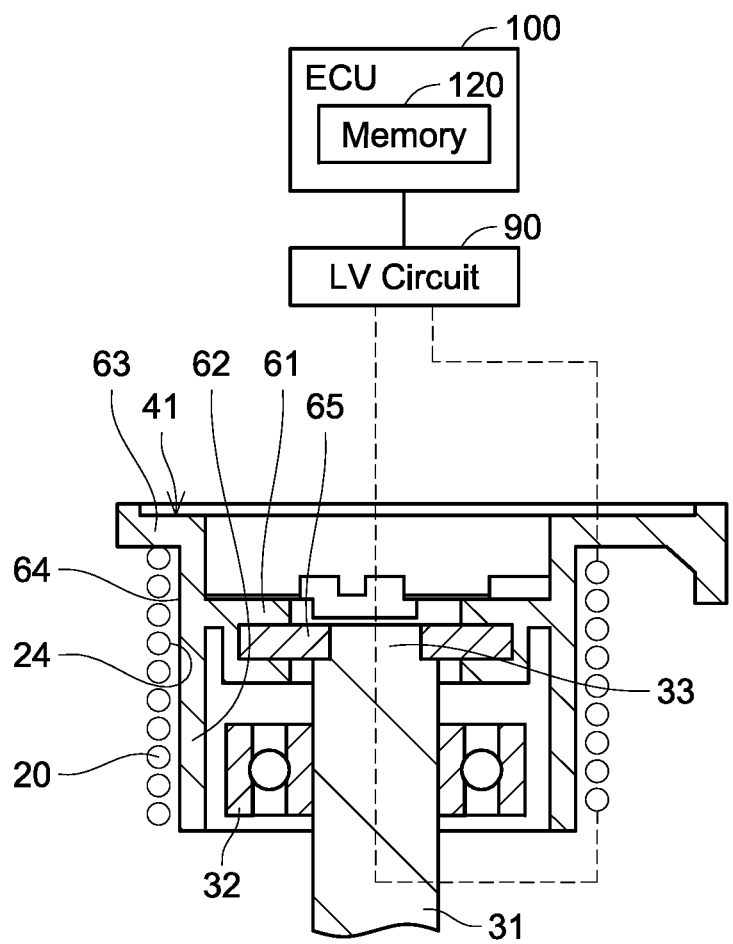
FIG. 6 is a cross-sectional view of a part of a valve device of a second embodiment.

As shown in FIG. 6, a valve device 2 of a second embodiment includes an LV circuit 90 instead of the CV circuit 80. The LV circuit 90 is connected to the one and the other ends of the coil spring 20 in the axial direction. The LV circuit 90 is a circuit configured to output a voltage value depending on an inductance of a coil to which the LV circuit 90 is connected. The inductance of a coil is generally proportional to the square of the number of turns of the coil. The LV circuit 90 outputs a voltage value depending on an inductance of the coil spring 20. The ECU 100 is configured to determine the rotation angle of the first gear 41, the valve shaft 31, and the valve body 30 based on the voltage value outputted from the LV circuit 90. Since the LV circuit 90 is incorporated in a known LV converter, a detailed description thereof will be omitted.

In the valve device 2 of the second embodiment, when the first gear 41, the valve shaft 31, and the valve body 30 rotate forward, the coil spring 20 is thereby circumferentially twisted in the forward rotation direction. When the coil spring 20 is twisted in the forward rotation direction, the number of turns of the coil spring 20 increases. When the number of turns of the coil spring 20 increases, the inductance of the coil spring 20 becomes larger proportional to the square of the number of turns. The larger the rotation angle of the first gear 41, the valve shaft 31, and the valve body 30 is, the larger the inductance of the coil spring 20 becomes.

As such, the ECU 100 determines the rotation angle of the valve body 30 and the valve shaft 31 based on the inductance of the coil spring 20 that changes with the rotation of the valve body 30 and the valve shaft 31. More specifically, the LV circuit 90 connected to the coil spring 20 outputs a voltage value depending on the inductance of the coil spring 20 when the coil spring 20 is not twisted or the inductance of the coil spring 20 when the coil spring 20 is twisted. Further, the ECU 100 determines the rotation angle of the first gear 41, the valve shaft 31, and the valve body 30 based on the voltage value outputted from the LV circuit 90. The ECU 100 determines the rotation angle of the first gear 41, the valve shaft 31, and the valve body 30 based on the graph T (see FIG. 5) stored in the memory 120. Due to this, the ECU 100 corresponds to a second detector.

(Effects)

The second embodiment has been described above. As it is apparent from the above description, the valve device 2 of the second embodiment can determine the rotation angle of the first gear 41, the valve shaft 31, and the valve body 30 by using the existing configuration. That is, the function of detecting the rotation angle can be provided to the valve device 2, while the valve device 2 is prevented from becoming oversized and complicated.

Further, the above valve device 2 includes the inner guide 62 (an example of a second conductive member) arranged on an inner side relative to the inner circumferential surface 24 of the coil spring 20 in the radial direction of the coil spring 20. The inner guide 62 functions as a core of the coil. This configuration ensures that the output value for determining the rotation angle is outputted.

Other Embodiments (1) In another embodiment, the inner guide 62 of the first gear 41 may not face the inner circumferential surface 24 of the coil spring 20 over the area from the one end to the other end of the coil spring 20 in the axial direction. The inner guide 62 may not face the inner circumferential surface 24 of the coil spring 20 over the whole area of the coil spring 20 in the axial direction. The inner guide 62 may face at least a part of the inner circumferential surface 24 of the coil spring 20.

(2) In another embodiment, metal plating may be applied on the outer circumferential surface 64 of the inner guide 62 of the first gear 41. The outer circumferential surface 64 of the inner guide 62 may be coated by a metal film. Alternatively, the outer circumferential surface 64 of the inner guide 62 may be covered by a metal plate. The metal film or the metal plate may be another example of the first conductive member. In this configuration, the capacitor is constituted of the coil spring 20 and one of the metal film and the metal plate.

Figure 7:
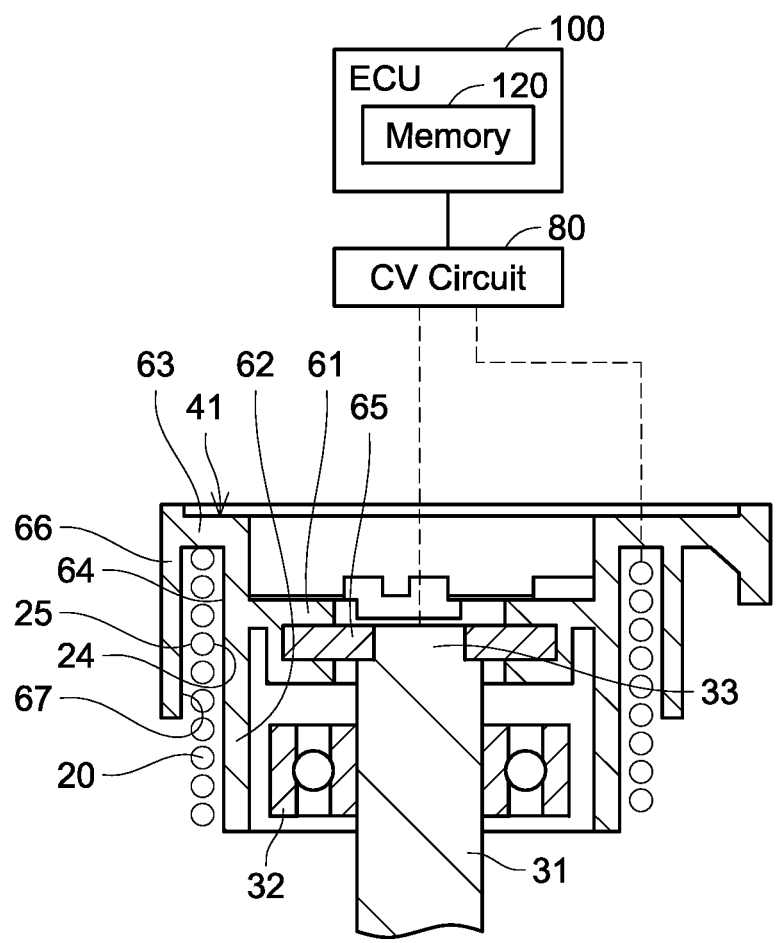
FIG. 7 is a cross-sectional view of a part of a valve device of another embodiment.

(3) In the first embodiment as above, the inner guide 62 facing the inner circumferential surface 24 of the coil spring 20 is an example of the first conductive member, however, no limitation is made to this configuration. In another embodiment, as shown in FIG. 7, the valve device 2 may include an outer guide 66 facing an outer circumferential surface 25 of the coil spring 20. The outer guide 66 is constituted of a conductor such as metal or conductive resin. The outer guide 66 may be another example of the first conductive member. The capacitor may be constituted of the coil spring 20 and the outer guide 66. The outer circumferential surface 25 of the coil spring 20 and an inner circumferential surface 67 of the outer guide 66 face each other. The CV circuit 80 is connected to the coil spring 20 and the outer guide 66 (not shown). The CV circuit 80 outputs a voltage value depending on an electrostatic capacitance between the coil spring 20 and the outer guide 66. This configuration can ensure that the output value for determining the rotation angle is outputted with a simple configuration, as well. Only a portion of the outer guide 66 facing the coil spring 20 may be constituted of a conductor such as metal or conductive resin.

(4) In the second embodiment as above, the inner guide 62 facing the inner circumferential surface 24 of the coil spring 20 is an example of the second conductive member, however, no limitation is made to this configuration. In another embodiment, the outer guide 66 facing the outer circumferential surface 25 of the coil spring 20 may be an example of the second conductive member. One of the inner guide 62 and the outer guide 66 may be an example of the second conductive member. Further, both the inner guide 62 and the outer guide 66 may be examples of the second conductive member.

(5) In the above embodiments, the ECU 100 determines the rotation angle of the first gear 41, the valve shaft 31, and the valve body 30 according to the graph T stored in the memory 120, however, no limitation is made to this configuration. In another embodiment, the ECU 100 may determine the rotation angle of the first gear 41, the valve shaft 31, and the valve body 30 according to a predetermined conversion equation. Similar to the graph T, the predetermined conversion equation indicates a relationship between the voltage value and the rotation angle.

(6) In the above embodiments, the valve device 2 is employed in the automobile, however, no limitation is made to this configuration. In another embodiment, the valve device 2 may be employed in machines or devices other than automobiles.

(7) In another embodiment, the valve device 2 may include, instead of the CV circuit 80, a circuit (not shown) configured to output a value of the electrostatic capacitance between the coil spring 20 and the inner guide 62 when the coil spring 20 is twisted. The ECU 100 may determine the rotation angle of the first gear 41, the valve shaft 31, and the valve body 30 based on this value of the electrostatic capacitance outputted from this circuit. That is, the ECU 100 may obtain the electrostatic capacitance between the coil spring 20 and the inner guide 62 from the circuit, and may detect the rotation angle from the obtained electrostatic capacitance.

(8) In another embodiment, in a case where a system including the valve device 2 includes two or more power sources, one of the power sources (one power source) may apply a voltage to the motor 50 and the other of the power sources (the other power source) may apply a voltage to the coil spring 20 or the inner guide 62 to generate a potential difference between them. For example, the coil spring 20 may be connected to the other power source and the inner guide 62 may be connected to the ground. Alternatively, the coil spring 20 may be connected to the ground and the inner guide 62 may be connected to the other power source. In this configuration, motor noise does not affect the detection of the rotation angle, thus accuracy for the detection of the rotation angle can be increased.

(9) In a variant of the first embodiment, the ECU 100 may include the function of the CV circuit 80. In this case, the CV circuit 80 may be omitted. Similarly, in a variant of the second embodiment, the ECU 100 may include the function of the LV circuit 90. In this case, the LV circuit 90 may be omitted.

What is claimed is:

1. A valve device comprising:
   a valve body;
   a valve shaft configured to rotate the valve body;
   a coil spring being electrically conductive and configured to be twisted with rotation of the valve body and the valve shaft;
   a second detector configured to detect at least one of a rotation angle of the valve body or a rotation angle of the valve shaft based on an inductance of the coil spring, the inductance changing according to a state of the coil spring that changes with the rotation of the valve body and the valve shaft; and
   at least one second conductive member being electrically conductive and arranged on at least one of: an inner side relative to an inner circumferential surface of the coil spring or an outer side relative to an outer circumferential surface of the coil spring in a radial direction of the coil spring;
   the at least one second conductive member defines a circumferential wall extending in an axial direction of the valve shaft, and
   the circumferential wall faces the coil spring over a whole area from one end to another end of the coil spring in an axial direction of the coil spring.

2. A system in which a valve device is mounted, the valve device comprising:
   a valve body;
   a valve shaft configured to rotate the valve body;
   a coil spring being electrically conductive and configured to be twisted with rotation of the valve body and the valve shaft;
   a second detector configured to detect at least one of a rotation angle of the valve body or a rotation angle of the valve shaft based on an inductance of the coil spring, the inductance changing according to a state of the coil spring that changes with the rotation of the valve body and the valve shaft, and
   at least one second conductive member being electrically conductive and arranged on at least one of: an inner side relative to an inner circumferential surface of the coil spring or an outer side relative to an outer circumferential surface of the coil spring in a radial direction of the coil spring;

the system comprising two power sources, wherein
the valve device further comprises a motor configured to be operated by direct current and to rotate the valve shaft, and
one of the two power sources is configured to apply a voltage to the motor and another of the two power sources is configured to apply a voltage to at least one of the coil spring or the at least one second conductive member to generate a potential difference between the coil spring and the at least one second conductive member.

* * * * *